United States Patent [19]

Shibahata et al.

[11] Patent Number: 4,878,557
[45] Date of Patent: Nov. 7, 1989

[54] AUXILIARY STEERING SYSTEM FOR WHEELED VEHICLE

[75] Inventors: Yasuji Shibahata, Yokohama; Yukio Fukunaga, Zushi; Yasumasa Tsubota, Yokosuka; Takaaki Uno, Zama; Yuji Okuyama, Atsugi, all of Japan

[73] Assignee: Nissan Motor Co., Ltd., Japan

[21] Appl. No.: 318,470

[22] Filed: Feb. 28, 1989

Related U.S. Application Data

[63] Continuation of Ser. No. 38,460, Apr. 16, 1987, abandoned, which is a continuation of Ser. No. 695,344, Jan. 28, 1985, abandoned.

[30] Foreign Application Priority Data

Jan. 31, 1984 [JP] Japan .................................. 59-15332

[51] Int. Cl.$^4$ .......................... B62D 5/04; B62D 5/06; B62D 6/02; B62D 6/04
[52] U.S. Cl. .................................... 180/140; 60/385; 91/536; 92/117 R; 180/141; 180/142; 180/79.1; 364/424.05
[58] Field of Search .................... 180/140, 141, 142, 143, 180/79, 79.1; 280/91; 364/424.05; 74/388 PS; 60/385, 386; 91/536; 92/117 R, 117 A

[56] References Cited

U.S. PATENT DOCUMENTS

| | | | |
|---|---|---|---|
| 3,744,587 | 7/1973 | Schimkat et al. | 180/142 |
| 3,866,706 | 2/1975 | Lincke et al. | 180/142 |
| 3,866,706 | 2/1975 | Lincke et al. | 180/142 |
| 3,882,953 | 5/1975 | Maisch | 180/141 |
| 3,897,846 | 8/1975 | Inoue | 180/142 |
| 3,958,656 | 5/1976 | Niemann | 180/142 X |
| 4,412,594 | 11/1983 | Furukawa et al. | 180/140 |
| 4,418,780 | 12/1983 | Ito et al. | 180/142 |
| 4,441,572 | 4/1984 | Ito et al. | 180/140 |
| 4,519,627 | 5/1985 | Shibahata et al. | 280/701 |
| 4,540,059 | 9/1985 | Shibahata et al. | 180/141 |
| 4,583,172 | 4/1986 | Furukawa et al. | 364/424 |
| 4,666,013 | 5/1987 | Shibahata et al. | 180/141 |
| 4,679,808 | 7/1987 | Ito et al. | 280/91 |
| 4,705,130 | 11/1987 | Fukunaga et al. | 180/140 |

FOREIGN PATENT DOCUMENTS

| | | | |
|---|---|---|---|
| 150856 | 8/1985 | European Pat. Off. | 180/79 |
| 2244659 | 9/1984 | France . | |
| 79754 | 6/1980 | Japan | 180/142 |
| 70774 | 5/1982 | Japan | 180/140 |
| 58-128962 | 1/1983 | Japan . | |
| 2083422 | 3/1982 | United Kingdom . | |

Primary Examiner—Mitchell J. Hill
Attorney, Agent, or Firm—Leydig, Voit & Mayer

[57] ABSTRACT

In addition to a conventional steering system for steering a vehicle through the front wheels in accordance with an angular displacement of the steering wheel, the vehicle is equipped with a negative feedback steering control system which steers the vehicle through the front or rear wheels in accordance with an instantaneous yaw rate of the vehicle. The feedback system has a vehicle behavior sensor for sensing the yaw rate, and an control circuit which determines an actual quantity which is equal to the yaw rate or a linear combination of the yaw rate and the time derivative of the yaw rate and a reference quantity which is a function of the angular displacement and the vehicle speed, so designed as to be approximately equal to the yaw rate if there is no disturbance. The control circuit produces a feedback signal proportional to a difference between the actual quantity multiplied by a first coefficient and the reference quantity multipled by a second coefficient. In response to the feedback signal, an actuator corrects the direction of the front or rear wheels in such a direction as to reduce the yaw rate. A lateral acceleration of the vehicle may be used in place of the yaw rate.

36 Claims, 11 Drawing Sheets

AUXILIARY STEERING SYSTEM FOR WHEELED VEHICLE

This application is a continuation of application Ser. No. 038,460 Filed Apr. 16, 1987, now abandoned, which is a continuation application of Ser. No. 695,344 Filed Jan. 28 1985, now abandoned.

BACKGROUND OF THE INVENTION

The present invention relates to an auxiliary steering system for automatically steering a wheeled vehicle so as to improve a cornering characteristic, and a directional stability of the vehicle, in addition to a main steering action commanded by a driver.

A turning behavior and steering stability of a wheeled vehicle are usually described by a relationship between a steering input, and a yaw rate or a lateral acceleration of the vehicle. The steering input is a driver's command to steer the vehicle. In general, a steering angle $\theta$ of a steering wheel is regarded as the steering input. The yaw rate (or yaw angular velocity) is an angular velocity of a rotation of the vehicle about a vertical axis passing through the center of gravity of the vehicle. The lateral acceleration is an acceleration of the center of gravity of the vehicle in a lateral direction of the vehicle.

It is desired that a vehicle should be turned to an amount corresponding to the driver's steering input without being affected by a disturbance such as a side wind and a friction coefficient of a road surface, and without delay. The amount of a turn of a vehicle can be described in terms of a ratio (yaw rate gain) of the yaw rate $\dot{\phi}$ (or the lateral acceleration $\alpha$) to the steering input (the steering angle $\theta$ of the steering wheel). The delay can be described by a lag (phase lag) of an output of the yaw rate (or the lateral acceleration) with respect to the steering input.

In a vehicle having no auxiliary steering control, the yaw rate gain is enhanced at a certain steering frequency, as shown by a curve "a" in FIG. 17, so that the behavior of the vehicle responsive to the steering input is increased abruptly at or near this steering frequency. Furthermore, the phase lag increases rapidly as the steering frequency increases as shown by a curve "a'" in FIG. 17. Therefore, the behavior of the vehicle is retarded with respect to the steering input, so that much skill is required for controlling the vehicle. It is desired that both of the yaw rate gain and the phase lag remain constant over the full range of the steering frequency.

Therefore, there has been proposed an auxiliary steering control system, as shown in FIG. 1, which steers the front or rear wheels in proportion to the yaw rate or lateral acceleration of the vehicle in such a negative direction as to reduce the direction change of the vehicle while the front wheels are steered by the steering input in a conventional manner. However, the auxiliary steering control system of this type is still unsatisfactory in that this system cannot fully eliminate the influence of the disturbance without decreasing the yaw rate gain excessively.

SUMMARY OF THE INVENTION

It is an object of the present invention to provide an auxiliary steering control system in which a hundred percent of the feedback is obtained to fully eliminate the influence of the disturbance when the steering input is equal to zero, and a desired percent of the feedback is obtained to provide a desired yaw rate gain when the steering wheel is turned.

According to the present invention, a vehicle comprises road wheels, a steering wheel, a steering mechanism for steering the vehicle by altering the direction of at least one of the road wheels in accordance with an angular displacement of the steering wheel. The vehicle further comprises a negative feedback system which comprises a steering angle sensor, vehicle behavior sensing means, negative feedback means, and actuating means. The steering angle sensor senses the angular displacement of the steering wheel. The vehicle behavior sensing means senses at least one variable which is indicative of an actual turning behavior of the vehicle. The vehicle behavior sensing means any sense either or both of a yaw rate of the vehicle and a lateral acceleration of the center of gravity of the vehicle. The negative feedback means is connected with the steering angel sensor and the vehicle behavoir sensing means, for producing a negative feedback signal in accordance with the different between a first quantity indicative of the actual turning behavior of the vehicle and determined in accordance with the variable sensed by the vehicle behavior sensing means multiplied by a first coefficient and a reference quantity multiplied by a second coefficient, the reference quantity being determined in accordance with the angular displacement sensed by the steering angle sensor. The actuating means steers the vehicle by altering the direction of at least one of the road wheels in accordance with the negative feedback signal in such a direction as to reduce the variable.

The variable to be sensed by the vehicle behavior sensing means may be a yaw rate of the vehicle or a lateral acceleration of the center of gravity of the vehicle. Preferably, the vehicle further comprises a vehicle speed sensor for sensing the speed of the vehicle, and the feedback means determines the reference quantity in accordance with the angular displacement sensed by the steering angle sensor and the vehicle speed sensed by the vehicle speed sensor. The first quantity indicative of the actual turning behavior may be the yaw rate or the lateral acceleration, or a linear combination of the yaw rate and the time derivative of the yaw rate or the lateral acceleration, or a linear combination of the lateral acceleration and the time derivative of the lateral acceleration or the yaw rate. The reference quantity may be a function of the angular displacement of the steering wheel and the vehicle speed, whose value is approximately equal to the actual yaw rate or lateral acceleration if there is no disturbance.

DETAILED DESCRIPTION OF THE INVENTION

Figure 1:
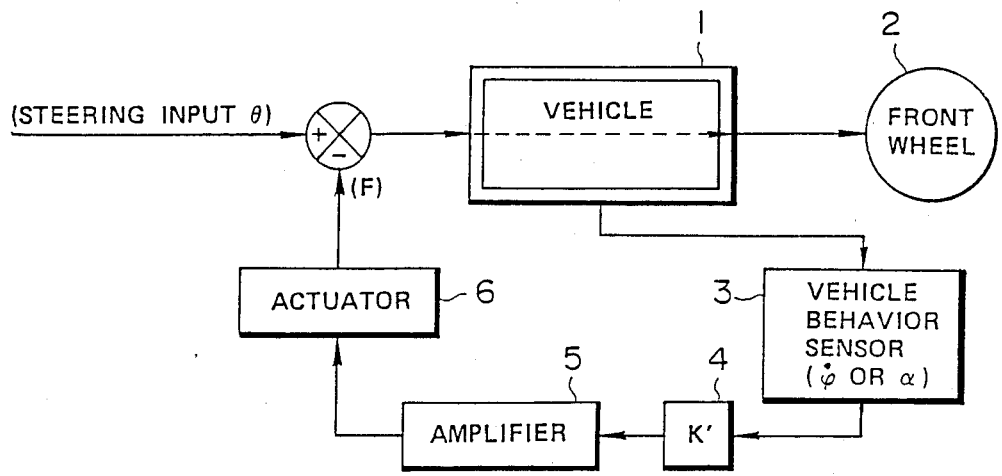
FIG. 1 is a schematic view of a negative feedback system of a conventional type auxiliary steering control system.
Figure 17:
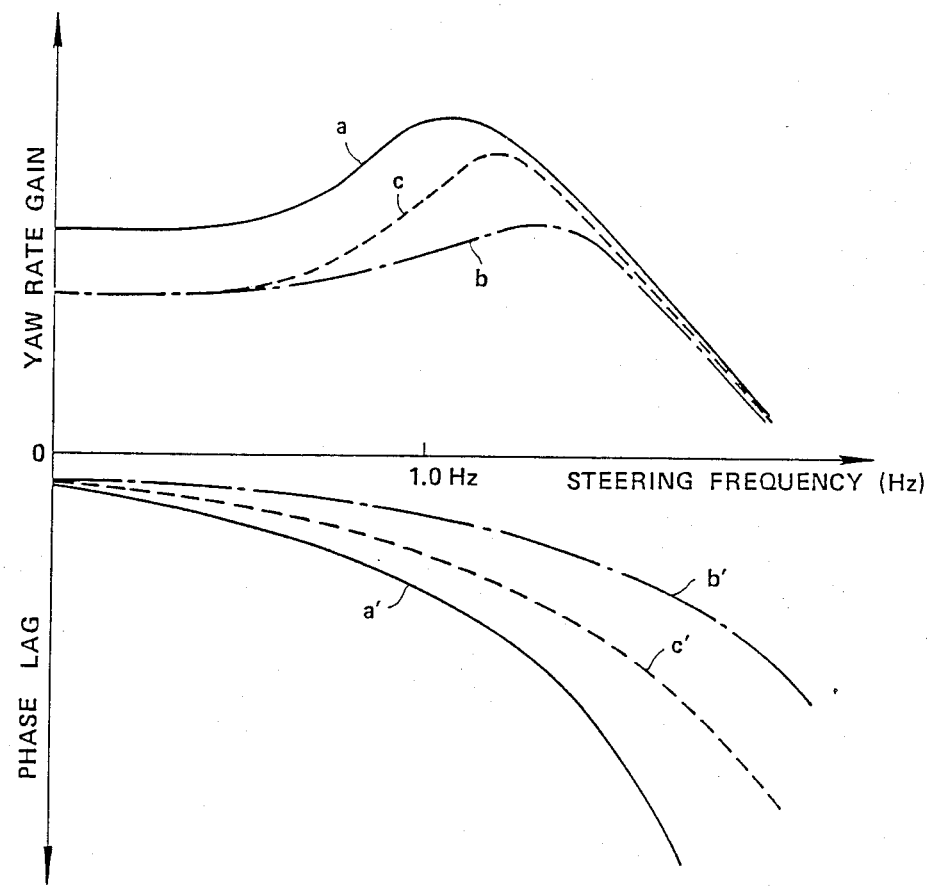
FIG. 17 is a diagram showing frequency characteristics of auxiliary steering control system.

FIG. 1 shows the above-mentioned auxiliary steering control system of a conventional type. In this system, front wheels 2 of a vehicle 1 are steered directly by the steering input on one hand. The front wheels 2 are steered, on the other hand, through a negative feedback circuit comprising a vehicle behavior sensor 3, a coefficient setter 4, an amplifier 5 and an actuator 6. The vehicle behavior sensor 3 senses the yaw rate $\dot{\phi}$ or lateral acceleration $\alpha$ of the vehicle, which is sent to the actuator 6 through the coefficient setter 4 and the amplifier 5. The actuator 6 provides a negative feedback input F to a front wheel steering mechanism of the vehicle. The aim of this auxiliary steering control system is to change the yaw rate gain versus steering frequency characteristic from the curve "a" of FIG. 17 toward a flatter curve "b" of a one-dot chain line, and to decrease the phase lag toward a curve "b'" of a one-dot chain line.

Even if the steering input is zero, this auxiliary steering control system steers the front wheels in the negative direction to reduce the yaw rate if there is any yaw rate or lateral acceleration caused by a disturbance such as a side wind. In this system, however, the negative feedback input F is determined only by a product of a predetermined coefficient K' and the yaw rate or lateral acceleration. Therefore, if the coefficient K' is great enough to fully eliminate the adverse influence of the disturbance, the yaw rate gain becomes so small that the driver experiences difficulty to steer the vehicle. In view of this, the coefficient K' is usually set within a range from 0.1 to 0.4. Consequently, this system cannot fully eliminate the influence of the disturbance, but this system can correct the vehicle bahavior only to about one third of the full extent (when K' is equal to 0.3).

Figure 2:
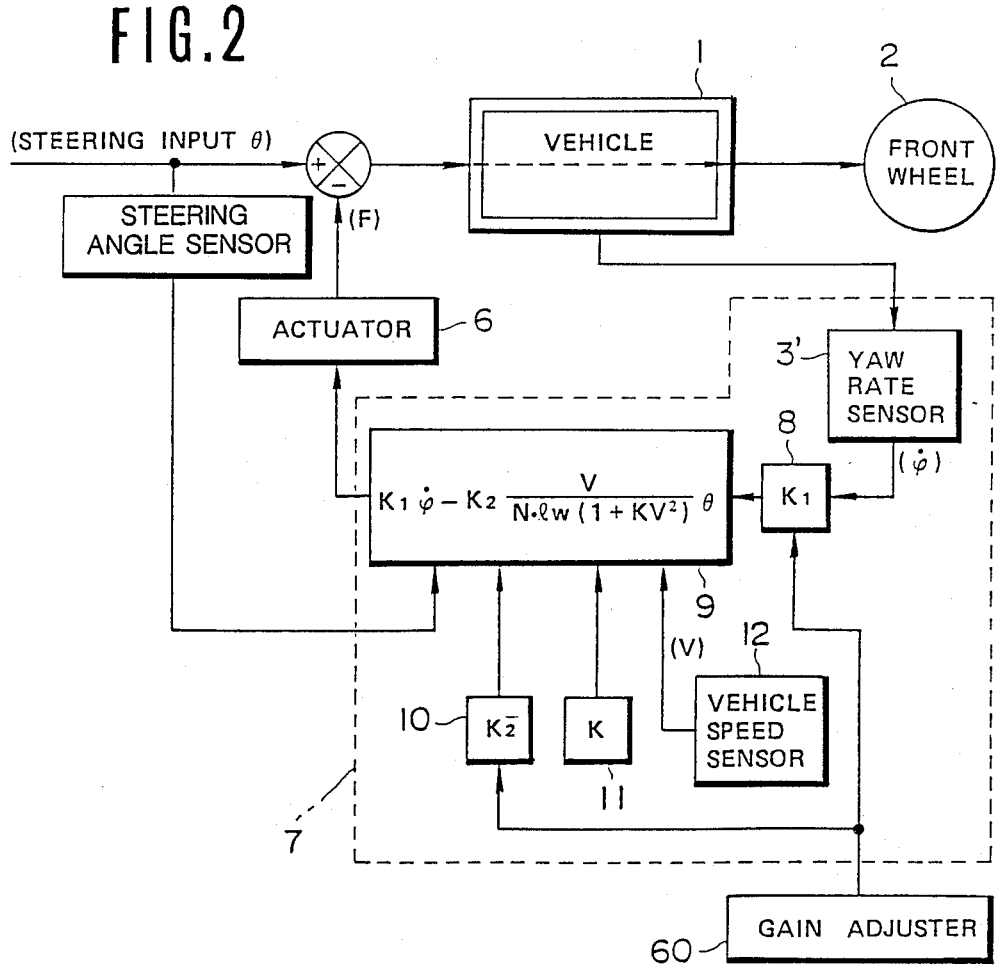
FIG. 2 is a schematic view of a negative feedback system of a first embodiment according to the present invention.

One embodiment of the present invention is shown in FIG. 2. A vehicle 1 is steered by means of front wheels 2 in accordance with a steering input corresponding to a driver's steering command. For example, the steering input is a steering angle $\theta$ which is an angular displacement of a steering wheel of the vehicle 1. Supplementarily, a negative feedback control unit 7 steers the vehicle 1 in a negative feedback manner by using an actuator 6. The control unit 7 determines a first quantity indicative of an actual turning behavior of the vehicle from a predetermined controlled variable such as a yaw rate (yaw angular velocity) of the vehicle, and produces a feedback signal in accordance with a difference between the determined first quantity and a predetermined reference quantity indicative of a desired reference turning behavior of the vehicle. The control unit 7 has a vehicle behavior sensor for sensing the controlled variable. In this embodiment, the variable is the yaw rate $\dot{\phi}|\dot{\rho}|$ of the vehicle, and the vehicle behavior sensor is a yaw rate sensor 3' such as a yaw rate gyro. The yaw rate sensor 3' senses the yaw rate $\dot{\phi}$ of the vehicle, and sends a signal indicative of the sensed yaw rate $\dot{\phi}$ to a first coefficient setter 8. The first coefficient setter 8 determines a product $K_1\dot{\phi}$ of a preset first coefficient $K_1$ and the sensed yaw rate $\dot{\phi}$, and sends a signal indicative of the determined product to an operational amplifier 9. In this embodiment, the first coefficient $K_1$ is equal to 1.0, for example.

The operational amplifier 9 of the control unit 7 further receives the steering input (the steering angle $\theta$ of the steering wheel), a second coefficient $K_2$ determined by a second coefficient setter 10, a constant K (stability factor) determined by a constant setter 11, and a vehicle speed V sensed by a vehicle speed sensor 12. In this embodiment, the second coefficient $K_2$ is equal to 0.7, for example. From these input data, and additional data of a steering gear ratio N and a wheel base $l_w$ which are both inherent to the vehicle, the operational amplifier 9 determines $$K_2 \frac{V}{N \cdot l_w(1 + KV^2)} \theta$$

by performing a mathematical operation, and subtracts the determined result from the product $K_1 \cdot \dot{\phi}$. The operational amplifier 9 amplifies a signal indicative of the result $$K_1 \cdot \dot{\phi} - K_2 \frac{V}{N \cdot l_w(1 + KV^2)} \theta$$

of the subtraction, and sends the amplified signal to the actuator 6.

In this embodiment, the first quantity indicative of the actual turning behavior of the vehicle 1 is the yaw rate sensed by the yaw rate sensor 3', and the reference quantity is $$\frac{V}{N \cdot l_w(1 + KV^2)} \theta.$$

A feedback gain is determined by a quantity $K_1 - K_2$. The feedback gain is equal to 0.3 when the first coefficient is equal to 1.0 and the second coefficient is equal to 0.7 as in this embodiment.

When the steering wheel is not turned, the reference quantity $$\frac{V}{N \cdot l_w(1 + KV^2)} \theta$$

calculated by the operational amplifier 9 is equal to zero because the steering input $\theta$ is equal to zero. If there is no disturbance such as a side wind, and the yaw rate $\dot{\phi}$ is equal to zero, then the quantity $K_1\dot{\phi}$ is also zero. Therefore, the operational amplifier 9 sends no signal to the actuator 6, and the actuator 6 produces no feedback input F. In this state, the control unit 7 can prevent the front wheels from being steered uselessly.

If a disturbance arises and causes the yaw rate during the absence of the steering input, then the quantity $K_1\phi$ deviates from zero while the reference quantity $$\frac{V}{N \cdot l_W(1 + KV^2)} \theta$$

remains equal to zero. As mentioned above, the first coefficient $K_1$ is equal to one in this embodiment, so that $K_1\phi = \phi$. Therefore, 100 percent of the yaw rate caused by the disturbance is fed back to the actuator 6, which therefore steers the front wheels 2 with the negative feedback input F so as to eliminate the yaw rate caused by the disturbance completely whereas the steering input remains zero.

When the steering wheel is turned, the control unit 7 supplies the actuator 6 with the signal indicative of the difference obtained by the subtraction whose minuend is the product of the first coefficient $K_1$ and the sensed yaw rate $\phi$ and whose subtrahend is the product of the second coefficient $K_2$ and the reference quantity $$\frac{V}{N \cdot l_W(1 + KV^2)} \theta.$$

Accordingly, the actuator 6 produces the negative feedback input F corresponding to the above mentioned difference, and by so doing steers the front wheels 2 secondarily in a return or negative direction opposite to a turn or positive direction commanded by the steering input. In this case, the feedback gain is determined by the difference obtained by subtracting the second coefficient $K_2$ from the first coefficient $K_1$. In this embodiment, the feedback gain is normally set equal to 0.2 by setting the first coefficient $K_1$ equal to 1.0 and the second coefficient $K_2$ equal to 0.7, so that the desired steering characteristic can be obtained.

Whether the reference quantity is exactly or approximately equal to $$\frac{V}{N \cdot l_W(1 + KV^2)} \theta,$$

the result is almost the same. The quantity $$\frac{V}{N \cdot l_W(1 + KV^2)} \theta$$

expresses the vehicle turning behavior which is determined by the steering input and the vehicle speed in a steady state turning movement of the vehicle. When the exact value of $$\frac{V}{N \cdot l_W(1 + KV^2)} \theta$$

is used, the control unit 7 can estimate the disturbance such as a side wind more accurately by comparing the first quantity and the reference quantity.

Figure 3:
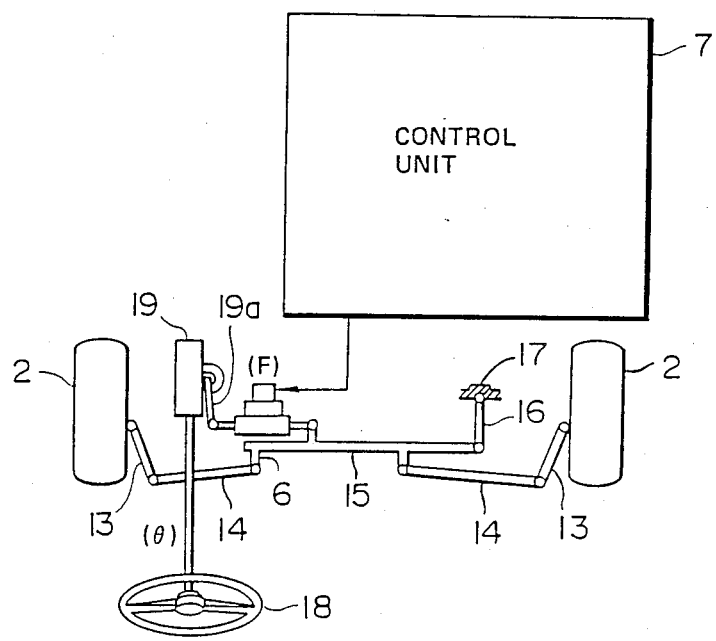
FIG. 3 is a schematic plan view of one example of a front wheel steering system which can be used in the present invention when the negative feedback steering control is performed by the front wheels.
Figure 4:
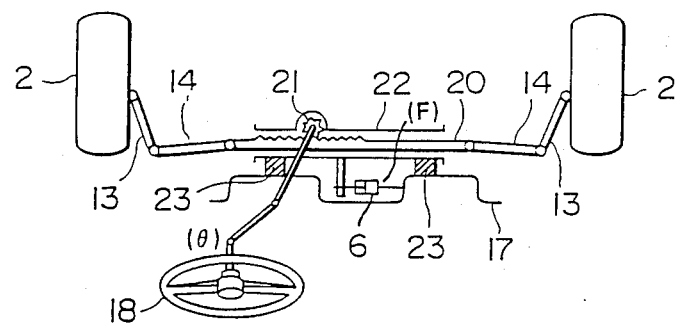
FIG. 4 is a schematic plan view of another example of a front wheel steering system which can be used in the present invention when the negative feedback steering control is performed by the front wheels.

In this embodiment, the actuator 6 is arranged to actuate a front wheel steering linkage which may be of a type shown in FIG. 3 or a type shown in FIG. 4.

In FIG. 3, the right and left front wheels 2 are connected to a vehicle body 17 through knuckle arms 13, side rods 14, a tie rod 15 and a link 16. A steering wheel 18 is connected to a steering gear 19. A swingable arm (pitman arm) 19a of the steering gear 19 is connected to the tie rod 15 through the actuator 6. The actuator 6 is a hydraulic servo actuator which provides the negative feedback input F to the front wheel steering linkage by expanding and contracting in accordance with the feedback signal of the control unit 7. Under command of the feedback signal, the actuator 7 alters the direction of the front wheels 2 in the negative direction which is opposite to the turn direction commanded by the driver through the steering wheel 18 or which is such a direction as to reduce or tend to reduce the yaw rate caused by the disturbance. When there is no feedback steering control action of the by control unit 7, the front wheels 2 are steered only by the steering input $\theta$ supplied from the steering wheel 18. In this case, a turning motion is transmitted from the steering wheel 18 through the pitman arm 19a, the actuator 6 held in the deactivated state, the tie rod 15, the side rods 14 and the knuckle arms 13 to the front wheels 2.

Figure 5:
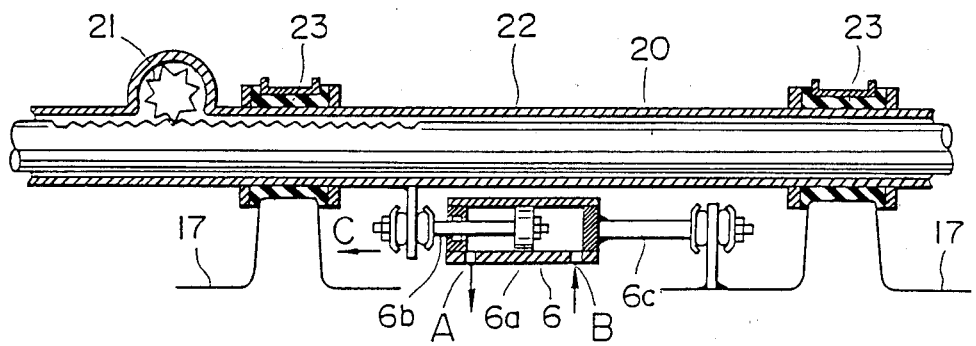
FIG. 5 is a detailed sectional view of a steering gear and an actuator of FIG. 4.
Figure 6:
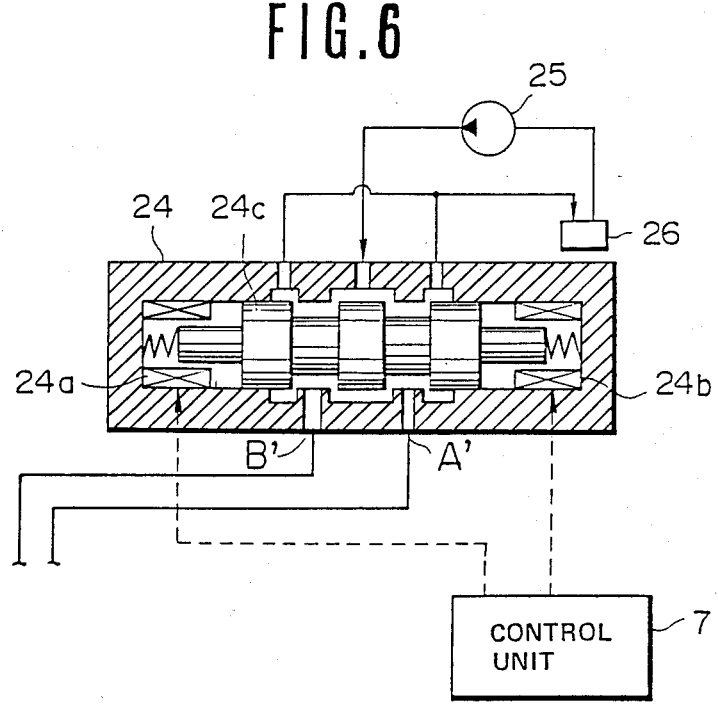
FIG. 6 is a detailed sectional view of an electromagnetic spool valve used in the example of FIG. 4.

In the case of FIGS. 4 to 6, the actuator 6 is connected with a steering gear of a rack and pinion type. A rack 20 is connected between right and left side rods 14. The rack 20 is engaged with a pinion 21 which is rotated by the steering wheel 18. The rack 20 and the pinion 21 are enclosed in a gear housing 22. In accordance with the steering input $\theta$ provided by the steering wheel 18, the pinion 21 is rotated, the rack 20 is moved longitudinally (toward the right or left front wheel 2), and the front wheels 2 are steered.

The gear housing 22 is supported on the vehicle body 17 through rubber bushes 33. The actuator 6 is connected with the gear housing 22 so that the gear housing 22 can be moved relative to the vehicle body toward the right or left front wheel 2 by the actuator 6. The actuator 6 has a hydraulic cylinder having a piston 6a which divides a cylinder bore into two chambers one of which has a port A and the other of which has a port B. The cylinder actuator 6 is disposed between the gear housing 22 and the vehicle body 17. The piston 6a is connected to the gear housing 22 through a piston rod 6b, and the cylinder is connected to the vehicle body 17 through a rod 6c. The actuator 6 is controlled by an electromagnetic spool valve 24. As shown in FIG. 6, the electromagnetic spool valve 24 has two solenoids 24a and 24b, and a spool 24c which is held in a neutral position shown in FIG. 6 by springs when both solenoids are deenergized. The valve 24 is connected with an oil pump 25 and a reservoir 26 by fluid conduits. The valve 24 has a port A' fluidly connected with the port A of the hydraulic cylinder actuator 6, and a port B' fluidly connected with the port B of the cylinder actuator 6.

The control unit 7 energizes the solenoid 24a or the solenoid 24b selectively. When the front wheels 2 are turned by the driver in such a left turn direction as to turn the vehicle left or when the yaw rate of the same left turn direction arises during the absence of the steering input of the steering wheel 18, the control unit 7 energizes the solenoid 24b, and thereby moves the spool 24c rightwards in FIG. 6 to supply an oil pressure to the port B'. This oil pressure is introduced into the cylinder actuator 6 through the port B, and moves the piston 6a in a direction shown by an arrow C in FIG. 5. This movement of the piston 6a forces the gear housing 22 to move together with the rack 20 in the same direction by deflection the rubber bushes 23. Therefore, the front wheels 2 are steered right, that is, in such a negative direction as to return the vehicle toward the straight ahead position or reduce the yaw rate of the vehicle produced during the absence of the driver's steering command. When the front wheels 2 are turned in a right turn direction by the steering wheel 18 or when the yaw rate of the right turn direction arises because of a disturbance, the control unit 7 energizes the solenoid 24a, and steers the front wheels 2 in the negative direction, which is a left direction in this case, to return the front wheels 2 toward the straight ahead position or reduce the yaw rate produced by the disturbance.

In the embodiment of FIG. 2, there is further provided a gain adjuster 60. The gain adjuster 60 controls the yaw rate gain by varying the first and second coefficients $K_1$ and $K_2$ in accordance with any one or more of conditions, such as vehicle speed, force of side wind, weather condition, road condition, acceleration or deceleration of the vehicle, vehicle weight, weight distribution between front and rear axles, and driver's taste. It is preferable to decrease the yaw rate gain as the vehicle speed in creases from the viewpoint of the directional control and stability of the vehicle at high speeds. Therefore, if the gain adjuster 60 employs the vehicle speed, the gain adjuster 60 decreases the yaw rate gain by increasing the first coefficient $K_1$ or decreasing the second coefficient $K_2$ or varying both of the first and second coefficients $K_1$ and $K_2$ so as to increase the feedback gain $K_1-K_2$, as the vehicle speed increases. Similarly, the yaw rate gain should be decreased as the environment of the vehicle become worse for the directional control and stability of the vehicle. Therefore, if the environmental conditions are taken into account, the gain adjuster 60 decreases the yaw rate gain by increasing the feedback gain $K_1-K_2$ when the side wind becomes stronger or when the weather becomes rainy or when the road surface becomes rugged. As the acceleration of the vehicle increases, the tendency of the vehicle to skid sideways increases. As the deceleration of the vehicle increases, the tendency to tack-in increases. Therefore, the gain adjuster 60 may be arranged to decrease the yaw rate gain by increasing the feedback gain $K_1-K_2$ as the acceleration or deceleration increases. As the weight of the vehicle increases, the lateral grip of the tires in the sidewise direction becomes deficient relatively, so that the stability in steering the vehicle becomes worse. Therefore, the gain adjuster 60 may be arranged to decrease the yaw rate gain by increasing the feedback gain $K_1-K_2$ as the vehicle weight increases. As the weight on the rear wheels increases as compared with the weight on the front wheels, the centrifugal force produced on a turn of the vehicle tends to cause the rear end of the vehicle to slide outwardly. Therefore, the gain adjuster 60 may be arranged to decrease the yaw rate gain by increasing the feedback gain $K_1-K_2$ as the weight on the rear axle increases. Furthermore, the gain adjuster 60 may be arranged to vary either or both of the first and second coefficients $K_1$ and $K_2$ in accordance with driver's manual operation so that the control system can provide the yaw rate gain suitable to the driver's taste. Thus, the gain adjuster 60 controls the yaw rate gain in accordance with any one or more of the vehicle speed, side wind force, weather condition, road surface condition, rate of change of vehicle velocity with respect to time, vehicle weight, weight distribution between front and rear wheels, and driver's taste.

Figure 7:
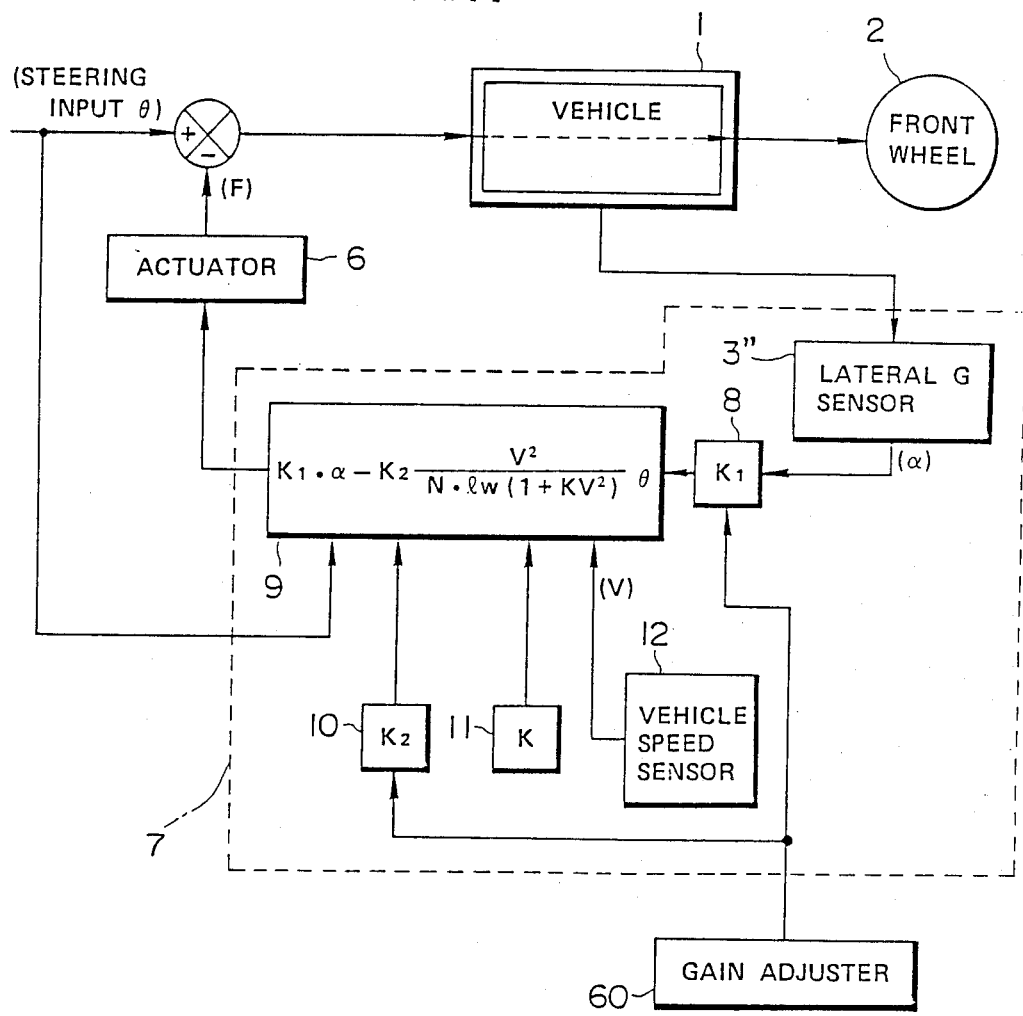
FIGS. 7 to 11 are schematic views of negative feedback systems of five other embodiments of the present invention, respectively.

A second embodiment of the present invention is shown in FIG. 7, in which the actual behavior of the vehicle is determined by the lateral acceleration $\alpha$ of the vehicle instead of the yaw rate $\dot{\phi}$. The vehicle behavior sensor of this embodiment is a lateral G sensor 3". The sensor 3" senses the lateral acceleration of the vehicle, and the first coefficient setter 8 provides the operational amplifier 9 with a signal indicative of the product of the sensed lateral acceleration $\alpha$ and a first coefficient $K_1$. Since the actual behavior is determined by the lateral acceleration, the reference quantity of this embodiment is set equal to $$\frac{V^2}{N \cdot l_W(1 + KV^2)} \theta.$$

The first and second coefficients $K_1$ and $K_2$ and the constant K are set at values adapted to the lateral acceleration instead of the yaw rate.

Figure 8:
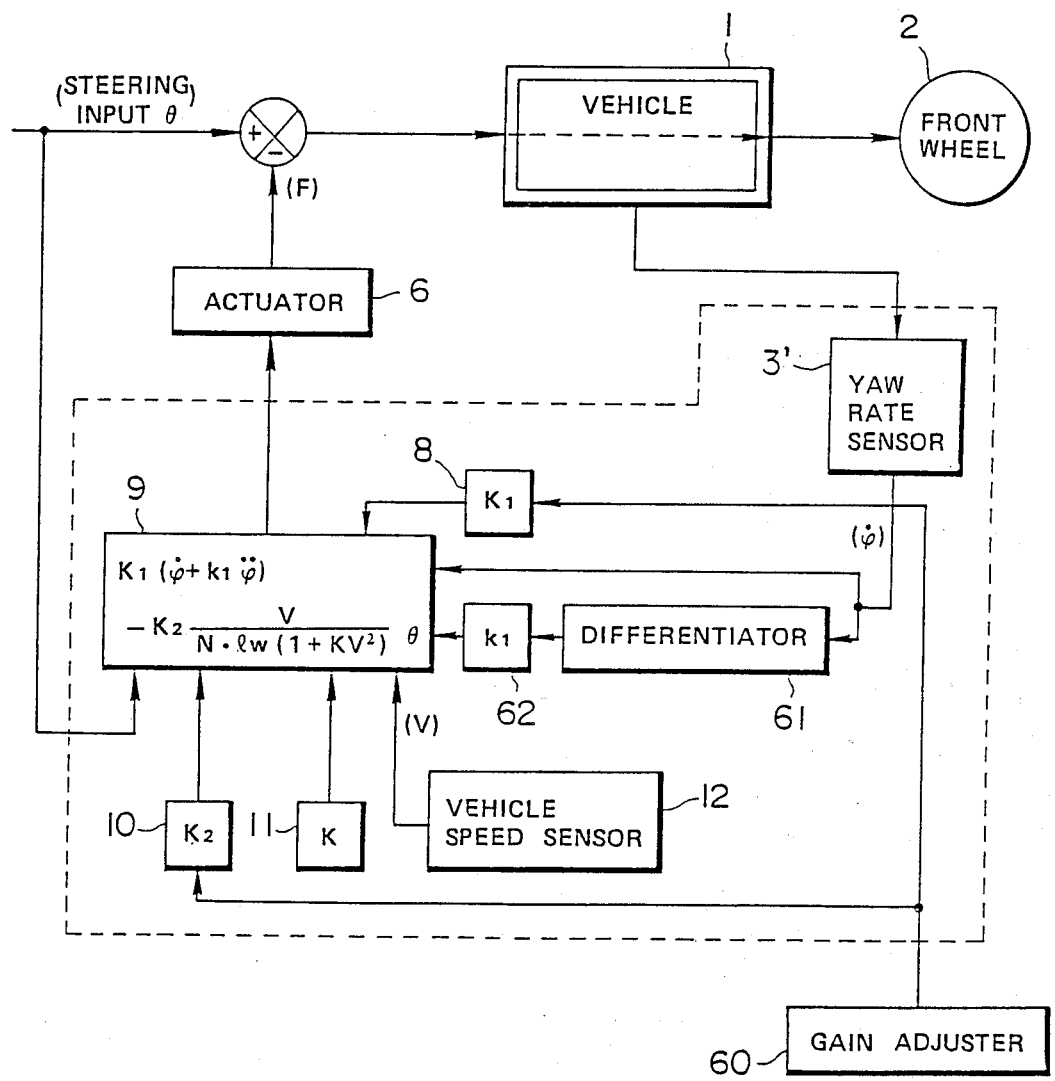

FIG. 8 shows a third embodiment of the present invention in which the first quantity indicative of the actual behavior of the vehicle is set as being equal to a linear combination of the yaw rate and the time derivative of the yaw rate in order to further improve the cornering characteristic of the vehicle. In the first and second embodiments having no derivative control action, the production of the negative feedback input F is retarded with respect to the detection of the yaw rate or lateral acceleration because of lag of each consituent elements of the control system, and besides, signal damping in unavoidable in a high frequency range. Accordingly, in some cases, the first and second embodiments cannot improve the yaw rate gain characteristic and the phase lag characteristic to a desired extent as shown by curves b and b' in FIG. 17, but only to an insufficient extent as shown by curves c and c' in FIG. 17. The third embodiment is arranged to eliminate lag and damping by adding a rate signal $\ddot{\phi}$ which changes speedily in response to a change of the actual behavior of the vehicle. In the system of FIG. 8, the yaw rate $\dot{\phi}$ sensed by the yaw rate sensor 3' is inputted directly to the operational amplifier 9 on one hand, and differentiated by a differentiator or differentiating circuit 61 on the other hand. A constant setter 62 receives the time derivative $\ddot{\phi}$ from the differentiator 61, and inputs the product $k_1\ddot{\phi}$ of the time derivative of $\dot{\phi}$ and a predetermined constant $k_1$ to the operational amplifier 9. The operational amplifier 9 sets the first quantity equal to the sum $\dot{\phi}+k_1\ddot{\phi}$. Thus, the control system of the third embodiment can provide the desired frequency characteristics as shown by the curves b and b' in FIG. 17.

Figure 9:
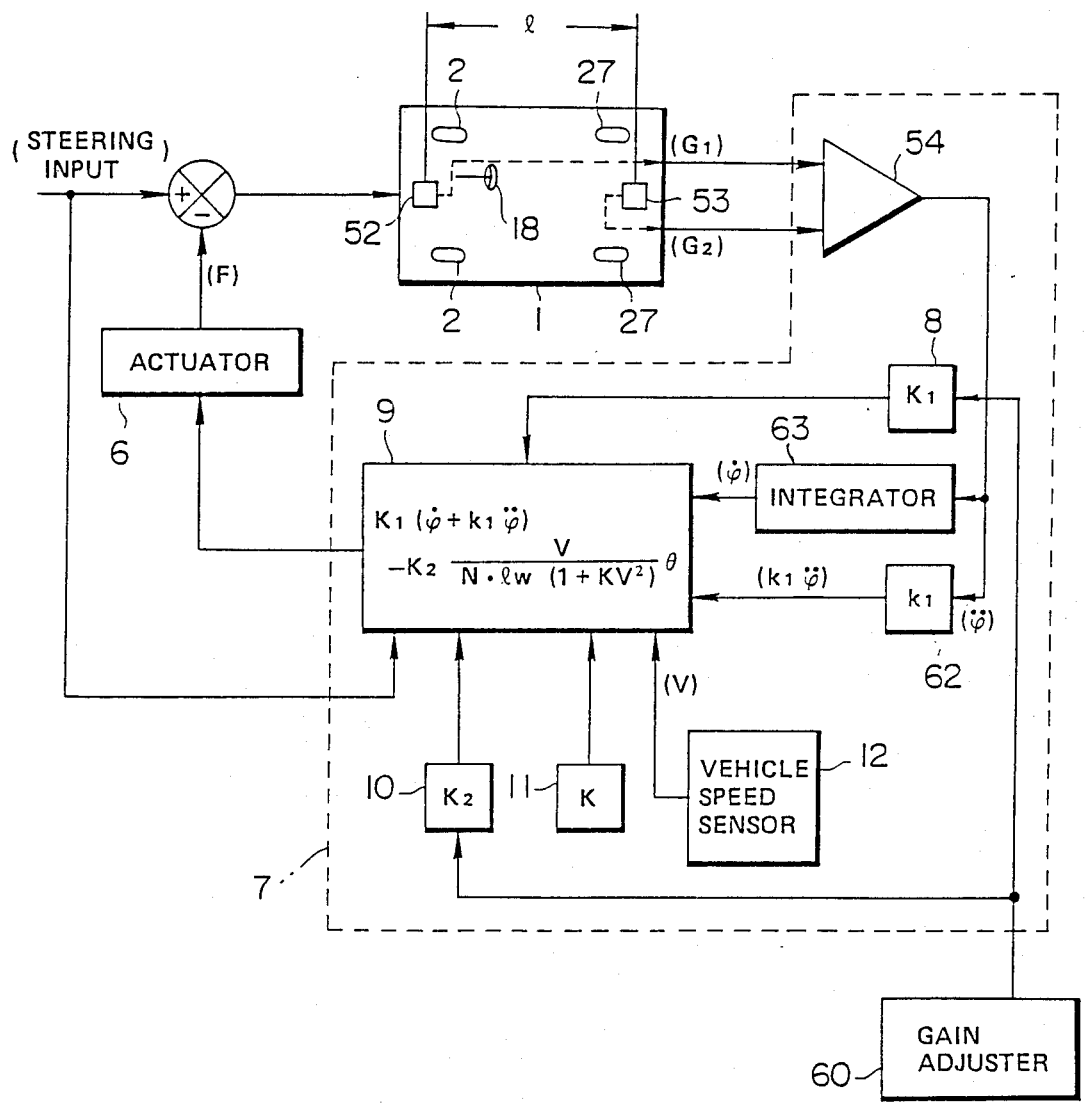

FIG. 9 shows a fourth embodiment of the present invention in which the yaw rate and the time derivative of the yaw rate are obtained in a different way from that of the third embodiment. In the fourth embodiment, a front lateral G sensor 52 is mounted on the vehicle 1 at the front, and a rear lateral G sensor 53 is mounted on the vehicle at the rear. The front and rear lateral G sensors 52 and 53 are at a distance l apart from each other along the longitudinal line of the vehicle 1. The front lateral G sensor 52 senses a lateral acceleration of the front of the vehicle, and the rear lateral G sensor 53 senses a lateral acceleration $G_2$ of the rear of the vehicle. The time derivative $\ddot{\phi}$ of the yaw rate is equal to the quotient obtained by dividing the front lateral acceleration $G_1$ minus the rear lateral acceleration $G_2$ by the distance l. Therefore, a differential amplifier 54 receives the front and rear lateral accelerations $G_1$ and $G_2$ sensed, respectively, by the front and rear sensors 52 and 53, and determines $(G_1-G_2)/l$. The output signal of the differential amplifier 54, indicative of $(G_1-G_2)/l$ is sent to an integrator or integrating circuit 63, and the constant setter 62. The integrator 63 determines the yaw rate $\dot{\phi}$ by finding the time integral $(\int (G_1-G_2)/l\, dt)$ of the input, and then inputs the thus-determined yaw rate $\dot{\phi}$ to the operational amplifier 9. The constant setter 62 multiplies the output of the differential amplifier 54 by a predetermined constant $k_1$, and provides the operational amplifier 9 with signal equal to $k_1\dot{\phi}$. The fourth embodiment can eliminate the necessity of a costly yaw rate gyro by employing the inexpensive lateral G sensors 52 and 53.

A fifth embodiment of the present invention is not illustrated. In the fifth embodiment, the actual quantity indicative of the first behavior of the vehicle is equal to a linear combination of the lateral acceleration $\alpha$ and the time derivative $\dot{\alpha}$ of the lateral acceleration, while the reference quantity is equal to $$\frac{V^2}{N \cdot l_W(1 + KV^2)} \theta.$$

The control unit of fifth embodiment has the lateral G sensor for sensing the lateral acceleration of the vehicle, and a differentiator for finding the time derivative of the lateral acceleration. The operational amplifier 9 of the fifth embodiment determines $$K_1(\alpha + k_1\dot{\alpha}) - K_2 \frac{V^2}{N \cdot l_W(1 + KV^2)} \theta.$$

Figure 10:
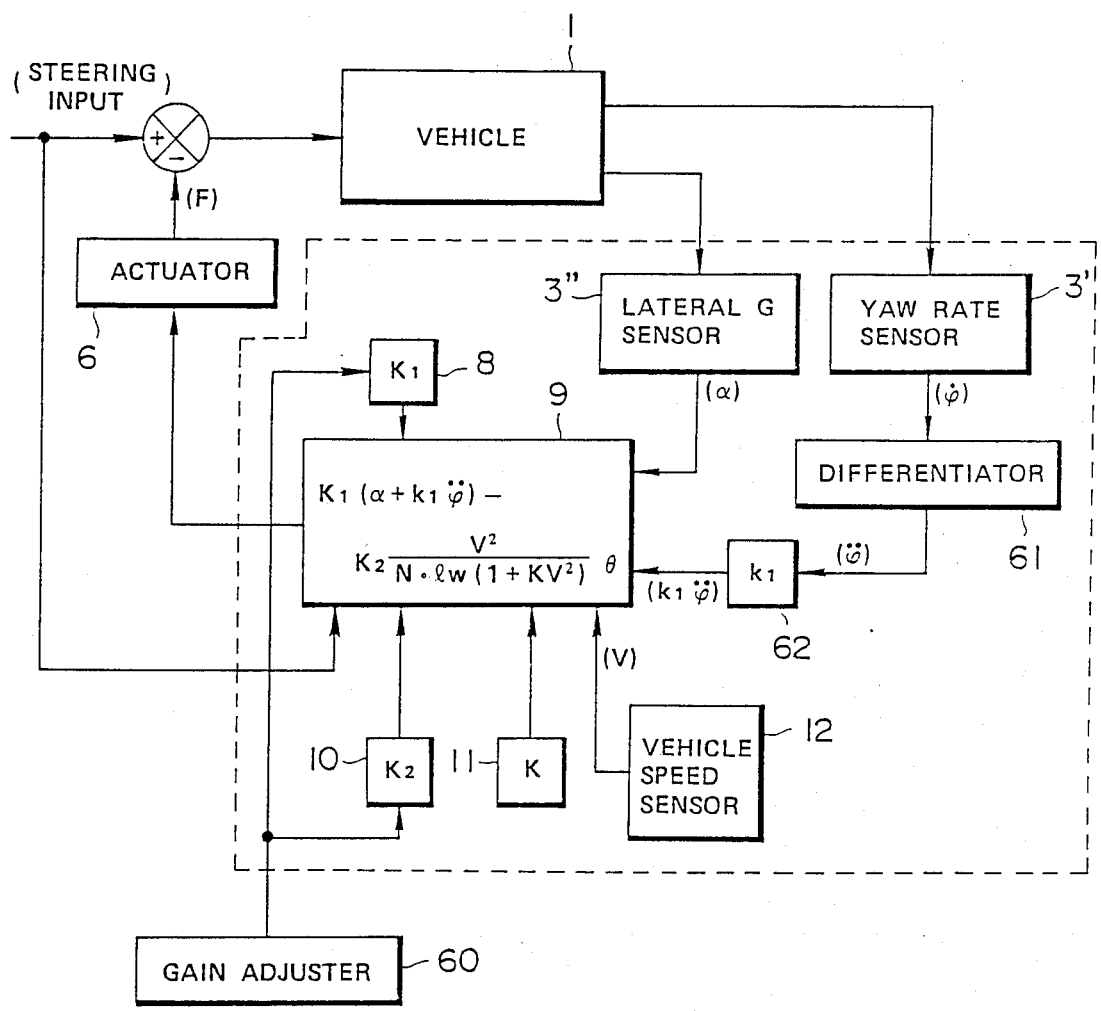

A sixth embodiment of the present invention is shown in FIG. 10. In the sixth embodiment, there are provided the lateral G sensor 3'', the yaw rate sensor 3', and the differentiator 61 for finding the time derivative (yaw acceleration) $\ddot{\phi}$ of the yaw rate sensed by the yaw rate sensor 3'. The operational amplifier 9 of this embodiment sets the first quantity equal to a linear combination $\ddot{\phi}$ of the yaw rate, and produces the feedback signal indicative of $$K_1(\alpha + k_1\ddot{\phi}) - K_2 \frac{V^2}{N \cdot l_W(1 + KV^2)} \theta.$$

In a seventh embodiment of the present invention which is not illustrated, the first quantity is set equal to a linear combination of the yaw rate $\dot{\phi}$ and the time derivative $\dot{\beta}$ of the lateral acceleration. The reference quantity is equal to $$\frac{V}{N \cdot l_W(1 + KV^2)} \theta.$$

The control systems of the fourth, fifth, sixth and seventh embodiments can provide the desired frequency characteristics as in the third embodiment.

Figure 11:
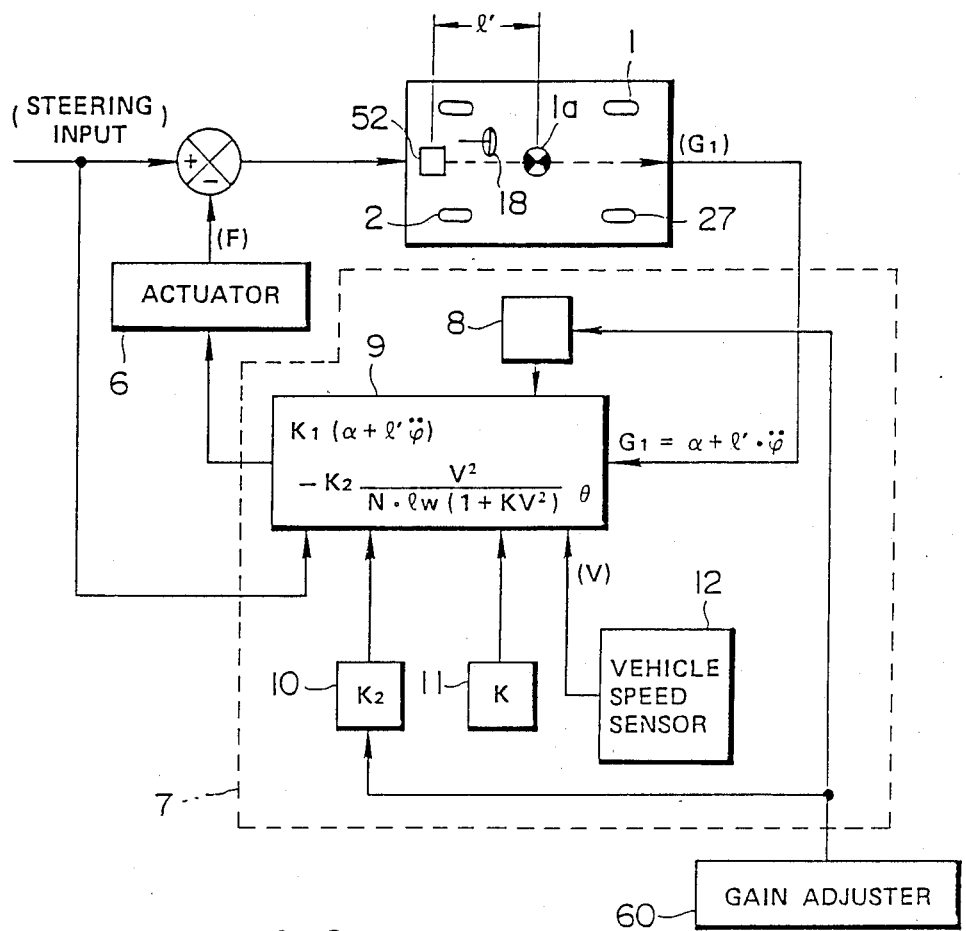

A eighth embodiment of the present invention is shown in FIG. 11. In the eighth embodiment, the first quantity is set equal to the linear combination of the lateral acceleration and the time derivative of the yaw rate as in the sixth embodiment of FIG. 10. However, the eighth embodiment uses only one lateral G sensor 65 and requires neither a differentiator nor an integrator, so that the eighth embodiment is advantageous in cost. As shown in FIG. 11, a front lateral G sensor 52 is mounted on the vehicle at the front. The front lateral G sensor 52 is at a distance $l'$ apart from the center of gravity 1a of the vehicle 1 along the longitudinal line of the vehicle. The eighth embodiment utilizes the relationship that a front lateral acceleration $G_1$ sensed by the front lateral G sensor 52 is equal to a sum $\alpha + l' \cdot \dot{\phi}$ between the lateral acceleration $\alpha$ acting at the center of gravity 1a and a product of the time derivative $\dot{\phi}$ of the yaw rate and the distance $l'$. In this embodiment, the front lateral G sensor 52 is located at such a position that the distance $l'$ is equal to the constant $k_1$. Therefore, the constant setter 62 is removed. The front lateral acceleration $G_1$ sensed by the sensor 52 is directly inputted to the operational amplifier 9, which produces the feedback signal indicative of $$K_1(\alpha + l'\dot{\phi}) - K_2 \frac{V^2}{N \cdot l_W(1 + KV^2)} \theta.$$

Figure 12:
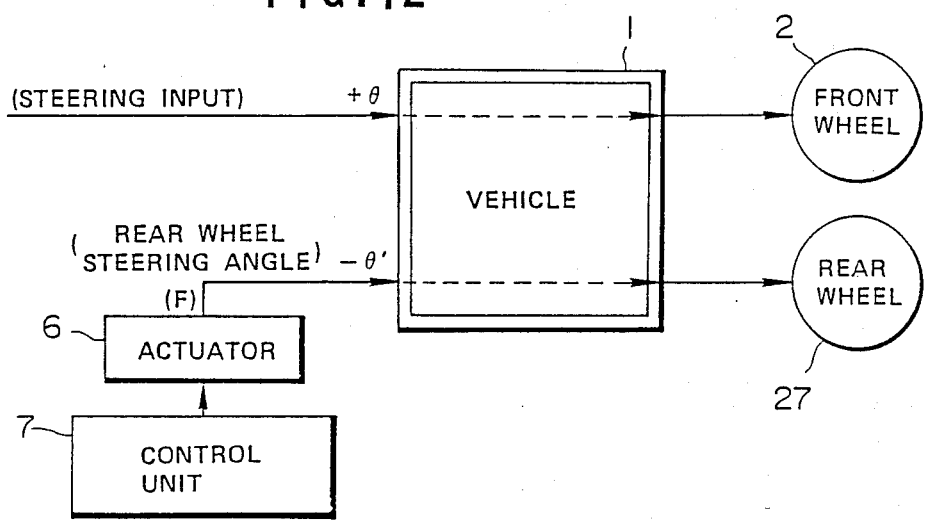
FIG. 12 is a schematic view of a negative feedback system of still another embodiment of the present invention in which the negative feedback steering control is performed by the rear wheels.

A ninth embodiment of the present invention is shown in FIG. 12. The control units of the preceding embodiments are arranged to steer the front wheels 2 in the negative direction. The control unit 7 of the ninth embodiment is arranged to steer the rear wheels 27 in such a negative direction as to reduce the yaw rate of the vehicle. That is, if the front wheels 2 are steered by the steering wheel 18, the control unit 7 steers the rear wheels 27 in the same direction as the front wheels 2. The ninth embodiment uses any one of the control units 7 of the preceding embodiments as its control unit 7. The actuator 6 of the ninth embodiment inputs the negative feedback input F in the form of a steering angle $-\theta$ of the rear wheels 27 into a rear wheel steering mechanism.

Figure 13:
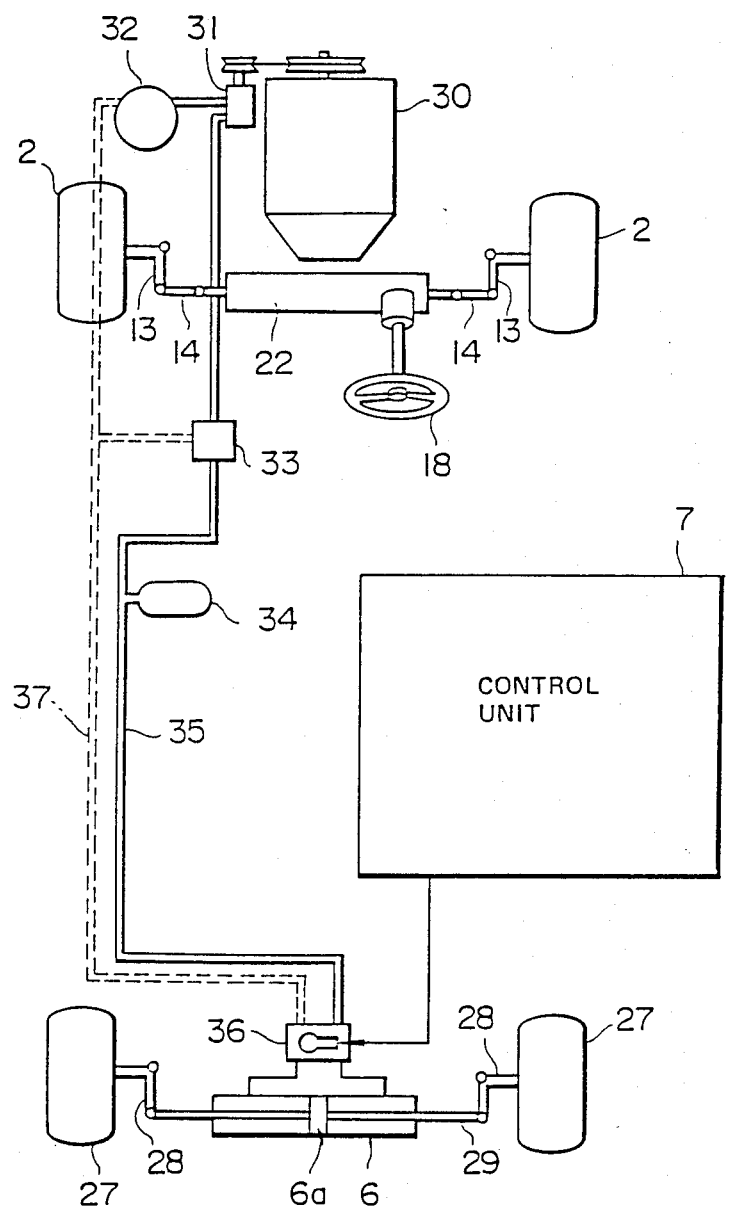
FIG. 13 is a schematic plan view of one example of a rear wheel steering system used in the embodiment of FIG. 12.
Figure 14:
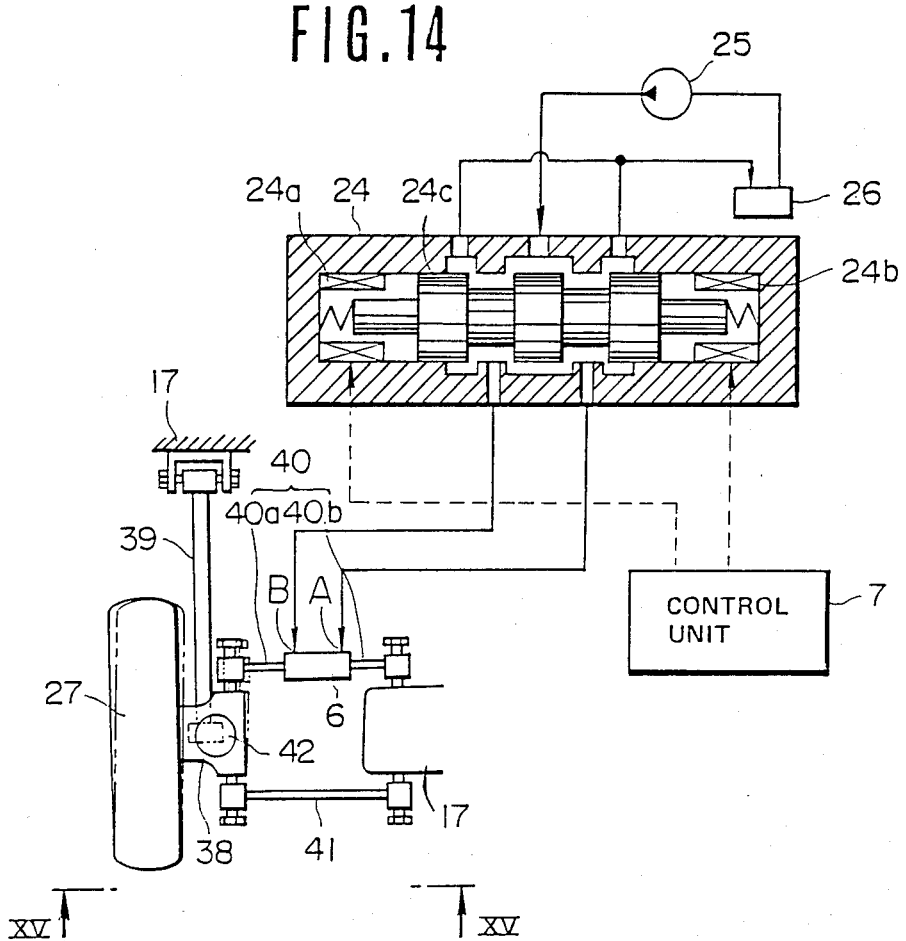
FIG. 14 is a schematic plan view of another example of a rear wheel steering system used in the embodiment of FIG. 12.
Figure 15:
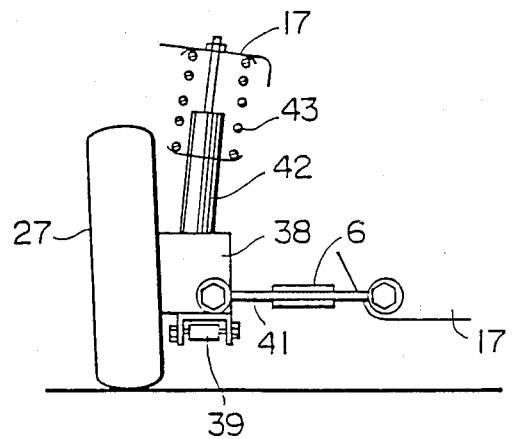
FIG. 15 is a schematic elevation as viewed from a line XV—XV in FIG. 14 in a direction shown by arrows.
Figure 16:
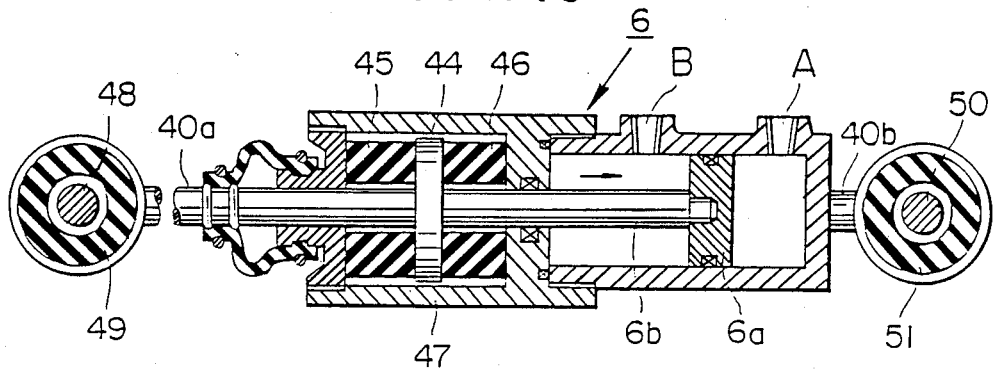
FIG. 16 is a detailed sectional view of an actuator shown in FIG. 14.

FIG. 13 shows one example of the actuator 6 used in the ninth embodiment, and FIGS. 14 to 16 shows another example. In FIG. 13, the front wheel steering mechanism comprises a steering wheel 18, a steering gear enclosed in a gear housing 22, side rods 14 and knuckle arms 13, but it is not provided with the actuator 6. The front wheel steering mechanisms of this embodiment is a conventional one. As shown in FIG. 13, each rear wheel 27 is rotatably supported by a knuckle arm 28. The right and left knuckle arms 28 are connected by a tie rod 29. Thus, the rear wheels 27 are steerable. The actuator 6 of this embodiment comprises a hydraulic cylinder actuator having a piston 6a. The piston 6a of the actuator 6 is fixed to the tie rod 29.

A hydraulic system for the actuator 6 has an oil pump 31 driven by an engine 30 mounted on the vehicle. The oil pump 31 sucks oil from an oil reservoir 32 and discharges the oil to an unload valve 33. The unload valve 33 controls the pressure of the oil discharged from the oil pump at a predetermined value, and supplies the pressured oil to an accumulator 34. The oil is supplied from the accumulator 34 to a servo valve 36 through a supply conduit 35. A return conduit 37 conveys an unnecessary oil from the servo valve 36 to the reservoir 32.

The servo valve 36 is controlled by the control unit 7 which is identical to any one of the control units of the preceding embodiments. When the front wheels 2 are steered right by turning the steering wheel 18 right, or when the yaw rate of the vehicle in the right turn direction is produced by a disturbance in the absence of the steering input, the control unit 7 commands the servo valve 36 to supply the oil pressure to the right cylinder chamber of the hydraulic cylinder, as viewed in FIG. 13. Therefore, the rear wheels 27 are steered in the same direction as the front wheels are steered by the steering wheel 18, that is, the right direction in this example, or in such a direction as to reduce the yaw rate produced by the disturbance. When the front wheels 2 are steered left by turning the steering wheel 18 left or when the leftward yaw rate is produced by a disturbance in the absence of a driver's steering command, the control unit 7 steers the rear wheels 27 in the same direction as the front wheels 2 are turned or in such a direction as to reduce the leftward yaw rate of the vehicle caused by the disturbance.

In another example shown in FIGS. 14 to 16, each of the rear wheels 27 is rotatably supported by a wheel support member 38. The wheel support member 38 of each rear wheels 27 is supported on the vehicle body 17 by a radius rod 39 in the fore and aft direction of the vehicle, and by two parallel lateral rods 40 and 41 in the lateral direction of the vehicle. As shown in FIG. 15, a strut assembly 42 extends upwardly from the wheel support member 38 to the vehicle body 17. The strut assembly 42 has a suspension spring 43.

The actuator 6 of a hydraulic cylinder type is disposed in a middle portion of the lateral rod 40 of each rear wheel 27. As shown in FIG. 16, the actuator 6 has a piston 6a, a piston rod 6b and two fluid chambers separated by the piston 6a. A fluid port A is formed in one fluid chamber and a fluid port B is formed in the other fluid chamber. The lateral rod 40 is divided into an outer portion 40a and an inner portion 40b. The actuator 6 is disposed between the inner and outer portions 40b and 40a. The piston rod 6a and the outer portion 40a of the lateral rod 40 are fixed end to end with the interposition of a circular disc 47 as to form an integral unit. The axes of the piston rod 6b and the outer portion 40a lie on the same straight line. The inner portion 40b of the lateral rod 40 is fixed to the cylinder so as to form an integral unit. Rubber bushes 45 and 46 are disposed on both sides of the disc 44, and enclosed in a tubular case 47 which is fixed to the cylinder so that the rubber bushes 45 and 46 are immovable axially.

An outboard end of the outer portion 40a of the lateral rod 40 is connected to the wheel support member 38 through a rubber bush 49 and a pin 48 fixed to the support member 38 as an outboard end of the lateral rod 41. An inboard end of the inner portion 40b of the lateral rod 40 is connected to the vehicle body 17 through a rubber bush 51 and a pin 50 fixed to the vehicle body 17 as an inboard end of the lateral rod 41.

The fluid ports A and B of the actuator 6 are fluidly connected, respectively, with ports A' and B' of an electromagnetic spool valve 24 similar to the spool valve of FIG. 6. The valve 24 is controlled by the control unit 7 identical to any one of the control units of the preceding embodiments.

When the front wheels 2 are turned right by the steering wheel 18 or when the yaw rate in the same right direction is caused by a disturbance during the absence of the steering wheel movement, the control unit 7 energizes a solenoid 24b of the valve 24 and thereby moves a spool 24c rightwards in FIG. 14. Accordingly, the fluid pressure is supplied to the port B through the port B', and the piston rod 6b is forced to move toward the inboard end of the lateral rod 40 as shown by an arrow in FIG. 16. During this, the piston rod 6b deflects the rubber bush 46 elastically, and the outer portion 40a of the lateral rod 40 moves toward the inboard end together with the piston rod 6b. As a result, the left rear wheel 27 is turned from a position shown by a solid line in FIG. 14 to a position shown by a two-dot chain line. The right rear wheel 27 is steered in the same direction as the left rear wheel 27 by the actuator 6 for the right rear wheel. Thus, the rear wheels 27 are turned in the same direction as the front wheels are turned by the steering wheel 18 or in such a direction as to reduce the yaw rate produced by the disturbance. When the front wheels are turned left by the steering wheel 18 or when the yaw rate in the left turn direction is produced by a disturbance during the absence of the steering wheel movement, the control unit 7 energizes a solenoid 24a of the valve 24 and supplies the fluid pressure to the port A of the actuator 6. Therefore, the rear wheels 27 are turned in the same direction as the front wheels 2 are turned by the steering wheel 18 or in such a direction as to reduce the yaw rate caused by the disturbance.

What is claimed is:

1. A vehicle comprising:
   road wheels;
   a steering wheel;
   a steering mechanism which steers the vehicle by altering the direction of at least one of said road wheels in accordance with angular displacement of said steering wheel;
   a steering angle sensor which senses the angular displacement of said steering wheel;
   a vehicle speed sensor which senses the speed of the vehicle;
   vehicle behavior sensing means for sensing a variable indicative of actual turning behavior of the vehicle;
   negative feedback means connected the said steering angle sensor, said vehicle speed sensor, and said vehicle behavior sensing means for producing a negative feedback signal which is proportional to the difference between a first quantity indicative of actual turning behavior of the vehicle multiplied by a first coefficient and a reference quantity multiplied by a second coefficient, the first quantity being a function of the variable which is sensed by said vehicle behavior sensing means and the reference quantity being determined in accordance with the angular displacement sensed by said steering angle sensor and the vehicle speed sensed by said vehicle speed sensor and being substantially equal to what the magnitude of the variable would be if the vehicle were performing a steady state turning motion with the sensed angular displacement and the sensed vehicle speed; and
   actuating means for steering the vehicle by altering the direction of at least one said road wheels in accordance with the negative feedback signal in such direction as to reduce the magnitude of the variable.

2. A vehicle according to claim 1, wherein the first quantity is equal to a linear combination of the yaw rate and the time rate-of-change of the yaw rate.

3. A vehicle according to claim 2, wherein the vehicle behavior sensing means comprises a yaw rate sensor for sensing the yaw rate of the vehicle, and a differentiation for finding the time rate-of-change of the yaw rate sensed by the yaw rate sensor.

4. The vehicle according to claim 2, wherein the vehicle behavior sensing means comprises a front lateral G sensor mounted on a front portion of the vehicle for sensing a lateral acceleration of the front portion, a rear lateral G sensor mounted on a rear portion of the vehicle for sensing a lateral acceleration of the rear portion, a differential amplifier for producing an output which is equal to $(G_1-G_2)/l$ where $G_1$ is the lateral acceleration sensed by the front lateral G sensor, $G_2$ is the lateral acceleration sensed by the rear lateral G sensor and $l$ is a distance between the front and rear lateral G sensors, and an integrator for finding the time integral of the output of the differential amplifier, and wherein the feedback means regards the time integral of the output of the differential amplifier as the yaw rate of the vehicle, and the output of the differential amplifier as the time rate-of-change of the yaw rate.

5. A vehicle according to claim 1, wherein the first quantity is equal to a linear combination of the yaw rate of the vehicle, and the time rate-of-change of the lateral acceleration of the center of gravity of the vehicle.

6. A vehicle according to claim 1, wherein the vehicle behavior sensing means senses a lateral acceleration of the center of gravity of the vehicle, the variable being the lateral acceleration of the center of gravity of the vehicle, the reference quantity being approximately equal to $$\frac{V^2}{N \cdot l_w(1 + KV^2)} \theta$$

where N is a steering gear ratio, $l_w$ is a wheel base of the vehicle, K is a predetermined stability factor, V is the vehicle speed, and $\theta$ is the angular displacement of the steering wheel.

7. A vehicle according to claim 5, wherein the actual quantity is equal to the lateral acceleration sensed by the vehicle behavior sensing means.

8. A vehicle according to claim 9, wherein the actual quantity is equal to a linear combination of the lateral acceleration sensed by the vehicle behavior sensing means, and the time rate-of-change of the lateral acceleration.

9. A vehicle according to claim 8, wherein the vehicle behavior sensing means comprises a center lateral G sensor mounted on the vehicle for sensing the lateral acceleration of the center of gravity of the vehicle, and a differentiator for differentiating the lateral acceleration sensed by the center lateral G sensor.

10. A vehicle according to claim 6, wherein the first quantity is equal to a linear combination of the lateral acceleration and the time rate-ofchange of the yaw rate of the vehicle.

11. A vehicle according to claim 10, wherein the vehicle behavior sensing means comprises a center lateral G sensor mounted on the vehicle for sensing the lateral acceleration of the center of gravity of the vehicle, a yaw rate sensor mounted on the vehicle for sensing the yaw rate of the vehicle, and a differentiator for differentiating the yaw rate sensed by the yaw rate sensor.

12. A vehicle according to claim 10, wherein the vehicle behavior sensing means comprises a front G sensor mounted on a front portion of the vehicle for sensing a lateral acceleration of the front portion of the vehicle, and the feedback means receives the output of the front lateral G sensor and regards the output of the front G sensor as the linear combination of the lateral acceleration of the center of gravity of the vehicle and the time rate-of-change of the yaw rate of the vehicle.

13. A vehicle according to claim 1, wherein the first coefficient is equal to one, and the second coefficient is equal to 0.7.

14. A vehicle according to claim 1, wherein the feedback means comprises a feedback coefficient adjusting means for varying a coefficient difference that remains after the second coefficient is subtracted from the first coefficient.

15. A vehicle according to claim 14, wherein the feedback coefficient adjusting means increases the coefficient difference as the vehicle speed increases.

16. A vehicle according to claim 14, wherein the feedback coefficient adjusting means increases the coefficient difference when a side wind becomes stronger than a predetermined level.

17. A vehicle according to claim 14, wherein the feedback coefficient adjusting means increases the coefficient difference when the weather becomes rainy.

18. A vehicle according to claim 14, wherein the feedback coefficient adjusting means increases the coefficient difference as a road condition under the vehicle becomes worse for the directional control of the vehicle.

19. A vehicle according to claim 14, wherein the feedback coefficient adjusting means increases the coefficient difference as the acceleration or deceleration of the vehicle increases.

20. A vehicle according to claim 14, wherein the feedback coefficient adjusting means increases the coefficient difference as the vehicle weight increases.

21. A vehicle according to claim 14, wherein the feedback coefficient adjusting means increase the coefficient difference as the weight on the rear wheels increases.

22. A vehicle according to claim 14, wherein the feedback coefficient adjusting means varies the coefficient difference in accordance with a manual operation.

23. A vehicle according to claim 1, wherein the road wheels comprises a pair of steerable front wheels and a pair of rear wheels, and the steering mechanism is connected between the steering wheel and the front wheels for controlling the direction of the front wheels in accordance with the angular displacement of the steering wheel, and wherein the actuating means is connected with the steering mechanism so that the actuating means can correct the direction of the front wheels in accordance with the feedback signal through the steering mechanism.

24. A vehicle according to claim 23, wherein the steering mechanism comprises a steering gear assembly which comprises a pinion rotated by the steering wheel, a rack which engaged with the pinion and is capable of steering the front wheels, and a gear housing enclosing the rack and pinion, the gear housing being supported on a body of the vehicle through rubber bushes so that the gear housing is movable longitudinally, and wherein the actuating means comprises a front hydraulic actuator comprising a cylinder fixed to the vehicle body and a piston connected with the gear housing for moving the gear housing longitudinally.

25. A vehicle according to claim 23, wherein the actuating means comprises a front hydraulic actuator, and the steering mechanism comprises a recirculating ball type steering gear having a pitman arm, right and left steering linkages for supporting the right and left front wheels, and a tire rod connecting the right and left steering linkages, the tie rod being connected with the pitman arm through the front hydraulic actuator.

26. A vehicle according to claim 1, wherein said road wheels comprise a pair of steerable front wheels and a pair of rear wheels, and said steering mechanism is connected between said steering wheel and said front wheels for controlling the direction of said front wheels in accordance with the angular displacement of said steering wheel, and wherein said actuating means is connected with said rear wheels for altering the direction of said rear wheels in accordance with the feedback signal.

27. A vehicle according to claim 26, wherein the actuating means comprises a right pair of first and second lateral rods extending along a lateral line of the vehicle and connecting the right rear wheel to the vehicle body, and a left pair of first and second lateral rods extending along the lateral line of the vehicle and connecting the left rear wheel to the vehicle body, the first lateral rod of each pair being divided into an inner rod portion and an outer rod portion, the rear actuating means further comprising a right rear hydraulic actuator disposed between the inner and outer rod portions of the first lateral rod of the right pair so that the length of the first lateral rod is variable, and a left rear hydraulic actuator disposed between the inner and outer rod portions of the first lateral rod of the left pair so that the length of the first lateral rod is variable, each of the rear actuators comprises a cylinder fixed to the inner rod portion, a piston separating two working fluid chambers, and a piston rod which is fixed with the piston and the outer rod portion, and formed with an outerward flange interposed between two rubber bushes so that the flange deflects one of the rubber bushes when the piston rod moves axially.

28. A vehicle according to claim 1 wherein the reference quantity is a product having a factor expressed as $V\theta/Nlw(1+KV^2)$ where N is a steering gear ratio of the vehicle, lw is a wheel base of the vehicle, K is a predetermined stability factor, V is the vehicle speed, and $\theta$ is the angular displacement of the steering wheel.

29. A vehicle according to claim 1 wherein said first coefficient is greater than said second coefficient.

30. A vehicle according to claim 29, wherein a difference resulting from subtraction of said second coefficient from said first coefficient is smaller than one.

31. A vehicle according to claim 1 wherein the reference quantity represents the steady state value of the variable when the vehicle is performing a steady state motion and is substantially equal to the value of a predetermined mathematical function of the vehicle speed and the angular displacement of the steering wheel.

32. A vehicle according to claim 1 wherein the reference quantity is substantially equal to the angular displacement of the steering wheel multiplied by a fraction whose denominator is given by $N \cdot l_w \cdot (1+KV^2)$ wherein N is the steering gear ratio of the vehicle, $l_w$ is the wheel base of the vehicle, K is a predetermined stability factor, and V is the vehicle speed and whose numerator is a quantity which depends only on the vehicle speed and increases as the vehicle speed increases.

33. A vehicle according to claim 1 wherein the variable indicative of actual turning behavior is or the lateral acceleration of the vehicle.

34. A vehicle according to claim 1 wherein the variable indicative of actual turning behavior is the yaw rate of the vehicle.

35. A vehicle comprising:
road wheels;
a steering wheel;
a steering mechanism which steers the vehicle by altering the direction of at least one of said road wheels in accordance with angular displacement of said steering wheel;
a steering angle sensor which senses the angular displacement of said steering wheel;
a vehicle speed sensor which senses the speed of the vehicle;
vehicle behavior sensing means for sensing the yaw rate of the vehicle;
negative feedback means connected with said steering angle sensor, said vehicle speed sensor, and said vehicle behavior sensing means for producing a negative feedback signal which is proportional to the difference between a first quantity which is a function of the yaw rate which is sensed by said vehicle behavior sensing means multiplied by a first coefficient and a reference quantity multiplied by a second coefficient, the reference quantity being approximately equal to $$\frac{V}{N \cdot l_W(1 + KV^2)} \theta$$

wherein N is the steering gear ratio of the vehicle, $1_w$ is the wheel base of the vehicle, K is a predetermined stability factor, V is the vehicle speed, and $\theta$ is the angular displacement of said steering wheel; and
actuating means for steering the vehicle by altering the direction of at least one of said road wheels in accordance with the negative feedback signal in such direction as to reduce the magnitude of the yaw rate.

36. A vehicle according to claim 35 wherein the first quantity equals the yaw rate of the vehicle sensed by said vehicle behavior sensing means.

* * * * *